(12) United States Patent
Chandrasekhara et al.

(10) Patent No.: US 8,504,813 B2
(45) Date of Patent: Aug. 6, 2013

(54) NETWORK BASED OPERATING SYSTEM MOBILITY MONITORING WHETHER AN OPERATING SYSTEM IS ACTIVE AND SELECTING A BOOT PROFILE TO BOOT ON A COMPUTER PLATFORM WHEN OPERATING SYSTEM IS INACTIVE

(75) Inventors: Vasu Chandrasekhara, Heidelberg (DE); Andreas Eberhart, Bruchsal (DE); Stefan Kraus, Rauenberg (DE); Ulrich Walther, Wiesloch (DE)

(73) Assignee: Fluid Operations GmbH, Walldorf (DE)

( * ) Notice: Subject to any disclaimer, the term of this patent is extended or adjusted under 35 U.S.C. 154(b) by 282 days.

(21) Appl. No.: 12/755,908

(22) Filed: Apr. 7, 2010

(65) Prior Publication Data

US 2011/0252224 A1    Oct. 13, 2011

(51) Int. Cl.
*G06F 15/177* (2006.01)
*G06F 9/00* (2006.01)
(52) U.S. Cl.
USPC .............................................. 713/2; 709/222
(58) Field of Classification Search
USPC ........................................................... 713/2
See application file for complete search history.

(56) References Cited

U.S. PATENT DOCUMENTS

| 6,728,896 | B1 * | 4/2004 | Forbes et al. .................. 714/4.5 |
| 6,959,331 | B1 * | 10/2005 | Traversat et al. ............. 709/222 |
| 6,990,573 | B2 * | 1/2006 | Cherian et al. .................... 713/1 |
| 7,702,892 | B1 * | 4/2010 | Bandhole et al. ................. 713/1 |
| 8,176,311 | B1 * | 5/2012 | Srinivasan et al. ............... 713/2 |
| 2004/0153640 | A1 * | 8/2004 | Sugita et al. ...................... 713/2 |
| 2006/0064688 | A1 * | 3/2006 | Tseng ............................... 718/1 |
| 2007/0220246 | A1 * | 9/2007 | Powell et al. .................... 713/2 |
| 2008/0028052 | A1 * | 1/2008 | Currid et al. .................. 709/222 |
| 2008/0263390 | A1 * | 10/2008 | Baba et al. ........................ 714/4 |
| 2008/0270825 | A1 * | 10/2008 | Goodson et al. ................. 714/6 |
| 2010/0095105 | A1 * | 4/2010 | Sevak .............................. 713/2 |
| 2011/0010714 | A1 * | 1/2011 | Powell et al. ..................... 718/1 |

\* cited by examiner

*Primary Examiner* — Thomas Lee
*Assistant Examiner* — Robert Cassity
(74) *Attorney, Agent, or Firm* — Kenyon & Kenyon, LLP

(57) ABSTRACT

For operating system mobility across heterogeneous computing platforms, a method may include periodically identifying whether an operating system is active until a determination that the operating system is inactive. Upon the determination that the operating system is inactive, one of a plurality of boot profiles that are each stored in association with a respective one of a plurality of computing platforms may be selected. The at least one boot profile may be associated with a target computing platform. The selected boot profile may be used in a booting process for booting the operating system on the target computing platform.

20 Claims, 5 Drawing Sheets

| Computing Platform 1 | Computing Platform 2 | Computing Platform n |
|---|---|---|
| Kernel 1 | Kernel 2 | Kernel n |
| Hardware Library 1 | Hardware Library 2 | Hardware Library n |
| Storage Driver 1 | Storage Driver 2 | Storage Driver n |

NETWORK BASED OPERATING SYSTEM MOBILITY MONITORING WHETHER AN OPERATING SYSTEM IS ACTIVE AND SELECTING A BOOT PROFILE TO BOOT ON A COMPUTER PLATFORM WHEN OPERATING SYSTEM IS INACTIVE

FIELD OF THE INVENTION

The present invention relates to the field of computer software and/or computer hardware, and particularly to operating system mobility between platforms of different types.

BACKGROUND

Operating systems are traditionally installed on, and closely tied to, a particular computing platform. The term computing platform may refer to both physical hardware such as server blades, network components and mass storage devices, as well as virtual computing platforms provided by hypervisors. Operating system mobility may refer to the ability to boot and run an operating system on more than one computing platform, for example, physical and/or virtual computing platforms. Current systems may only allow for operating system mobility between computing platforms that are of the same type. For example, operating system mobility may be available from one server blade to another server blade of the same type or from one hypervisor to another hypervisor of the same type.

Modern operating systems may include a bootstrapping mechanism to load the integral parts of the operating system and its various hardware drivers into the main memory of a computing platform during a boot process. Typically, the installation procedure may place the necessary operating system files on an attached boot disk and may set the configuration of the operating system installation in such a way that the critical drivers necessary to boot are in the correct location within the boot disk and loaded in the correct order. Parts of the bootstrap mechanism may be dependent upon the hardware initialization and startup procedures such as a Basic Input/Output System (BIOS) or an Extensible Firmware Interface (EFI).

Computing, network and storage resources are increasingly becoming virtualized. This virtualization may introduce an additional abstraction layer between hardware and software, which allows for a looser coupling between computing, network and storage resources. In this manner, software may be more easily migrated to spare hardware before the original hardware is taken offline for maintenance. Examples for this approach can be found in many hypervisor applications. Virtualized network switches and blade technology also may allow for similar functionality without the use of hypervisors. In these examples, systems may need to be stopped and restarted during the migration, whereas hypervisors can perform this task without downtime.

Furthermore, with the advent of Storage Area Networks (SAN), Network Attached Storage (NAS) and Server Virtualization, the lines between locally attached storage, physical storage and virtual storage are blurred. Utilizing such network boot systems, a storage device with a pre-installed operating system can quickly be detached and attached to compatible, but different, hardware. The storage device may also serve as a bootable startup disk from which the hardware initialization may read the operating system loader and continue the boot process.

For example, an operating system installed in a Logical Unit Number (LUN) served by a storage system could be simultaneously made available via Fibre Channel (FC), internet Small Computer System Interface (iSCSI) target or even as a flat file on a Network File System (NFS) or a Common Internet File System (CIFS). Similarly, the hardware attached to the LUN may be from different manufactures or even different virtualized machines.

As discussed above, the current technology for migrating an operating system between computing platforms has limitations and typically only allows for operating system mobility between computing platforms that are of the same type. For example, source and target computing platforms must be of the same system type for the migration to be successful. For addressing this problem, cluster takeover and hardware redundancy paradigms have been proposed, which may be relatively expensive to implement. Therefore, a need exists for operating system mobility for computing platforms of different types, where the source and destination types can be any combination of physical or virtual computing platforms.

BRIEF DESCRIPTION OF THE DRAWINGS

FIG. 4 illustrates a computing platform lookup table according to an example embodiment of the present invention.

DETAILED DESCRIPTION

Example embodiments of the present invention provide an application and hardware system that allows an operating system and its installed applications to be moved between various heterogeneous computing platforms. More specifically, example embodiments provide software that configures computer operating systems, network components and computer hardware such that operating systems residing on network-connected storage can be migrated or switched from one computing platform, which may contain a central processing unit (CPU), input/output hardware, one or more memory devices and/or a hypervisor, to another computing platform of a different type.

Example embodiments of the present invention provide a computer-implemented method for operating system mobility across heterogeneous computing platforms. A boot disk may be configured to include one or more boot profiles that are associated with one or more computing platforms, and to include components identified by the boot profiles. A preliminary operating system (pre-OS) application may be launched to initiate a boot process that includes reading a heartbeat record and a hardware fingerprint. The heartbeat record and hardware fingerprint may be written using a service running in the operating system of the computing platform. During the boot process, the preliminary operating system application may identify whether the operating system is already or still active on another computing platform based upon at least the heartbeat record. In an example embodiment, when the application determines that the operating system is active, the preliminary operating system application pauses the boot process until the operating system is inactive. When the operating system is inactive, the preliminary operating system application may compare the one or more boot profiles with the hardware fingerprint to identify a computing platform and select a boot profile associated with the identified computing platform. Once a boot profile is selected, the preliminary operating system application may instruct to boot the operating system on the boot disk using the components identified by the selected boot profile.

Figure 1:
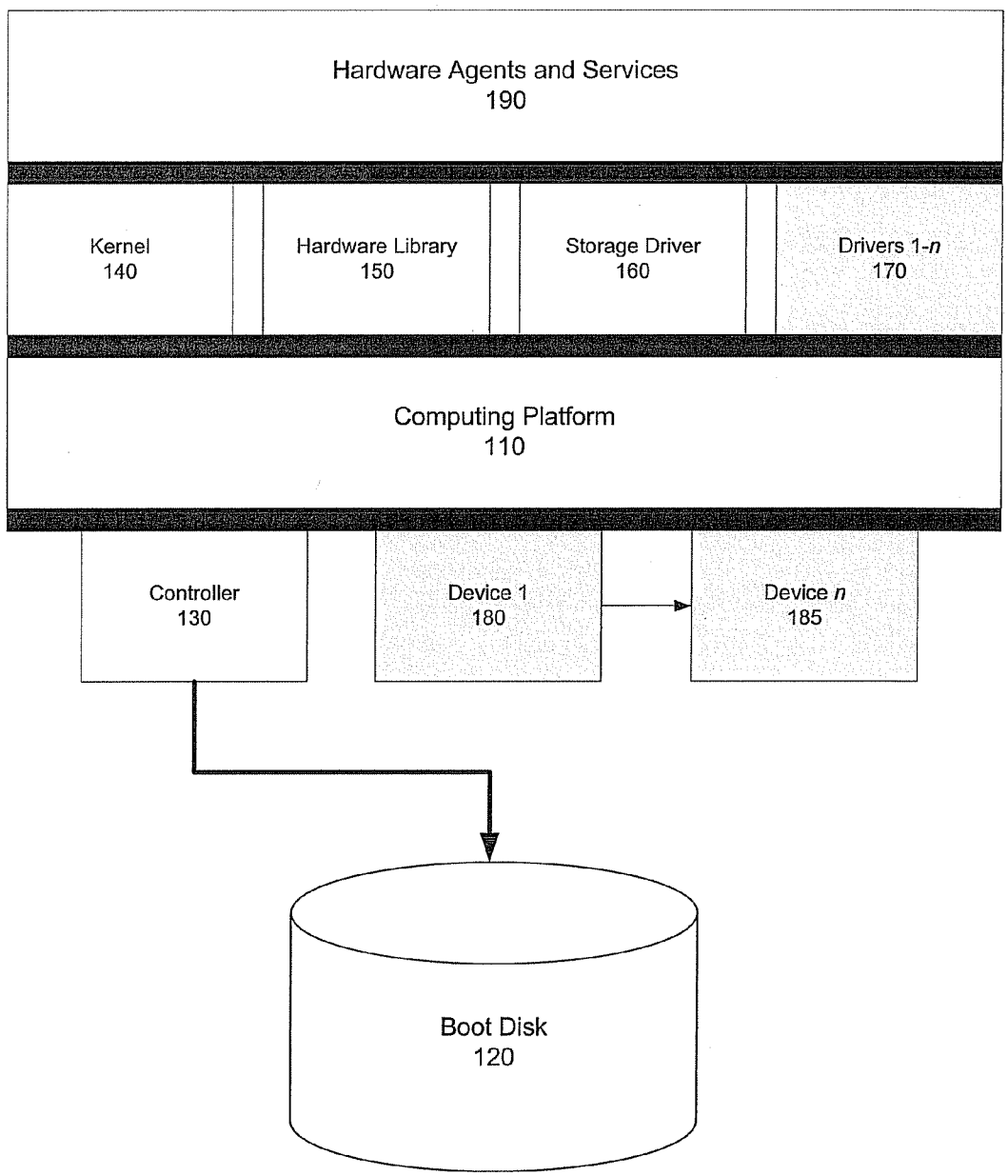
FIG. 1 illustrates a computing system according to an example embodiment of the present invention.

FIG. 1 illustrates a computing system 100 according to an example embodiment of the present invention. Computing system 100 may include computing platform 110. Computing platform 110 may be a hardware-based computing platform, such as a server blade, network component, personal computer or other computing device. Alternatively, computing platform 110 may be a virtual computing platform, such as a hypervisor application. Computing platform 110 may be connected to boot disk 120. The connection between computing platform 110 and boot disk 120 may be a local connection, such as via an universal serial bus (USB) or may be implemented via a storage area network using a network connection such as Fibre Channel Protocol (FCP), Fibre Channel over Ethernet (FCoE), HyperSCSI or iSCSI.

In an example embodiment of the present invention, computing platform 110 may be connected to one or more devices. One of the devices may be controller 130, which may be a microprocessor. Other devices, such as device 1 180 to device n 185, where n is a positive integer, may include, for example, input/output devices such as a keyboard, mouse or printer. Of course, other devices may be connected with computing platform 110.

In an example embodiment of the present invention, computing system 100 may include one or more files to interact properly with an operating system, for example, to successfully boot an operating system onto a particular computing platform. For instance, different computing platforms may require different files to interact with a common operating system. For example, computing system 100 may include kernel 140, which may be associated with an operating system running on computing platform 110. In addition, computing system 100 may include hardware library 150, which may include a library of files for interaction between an operating system and hardware within computing system 100. An example of such files may be a dynamic link library (DLL) file. Computing system 100 may also include storage driver 160, which may be used by an operating system to interact with a storage device, such as the boot disk 120. Computing system 100 may also include drivers 1-n 170, which may correspond to device 1 180 to device n 185.

Computing system 100 may include hardware agents and services 190. Hardware agents and services 190 may be computing platform-specific. For example, different computing platforms may include different sets of hardware agents and services. These may include, but are not limited to, specific network interface controllers (NICs), redundant array of independent disks (RAID) controllers, southbride and northbride drivers, or specific Central Processing Unit (CPU) drivers (like Intel® or AMD®), as well as drivers which report sensor information (e.g. fan speed, CPU temperature etc.) for a specific computing platform and agents or services which react upon the measured data.

Figure 2:
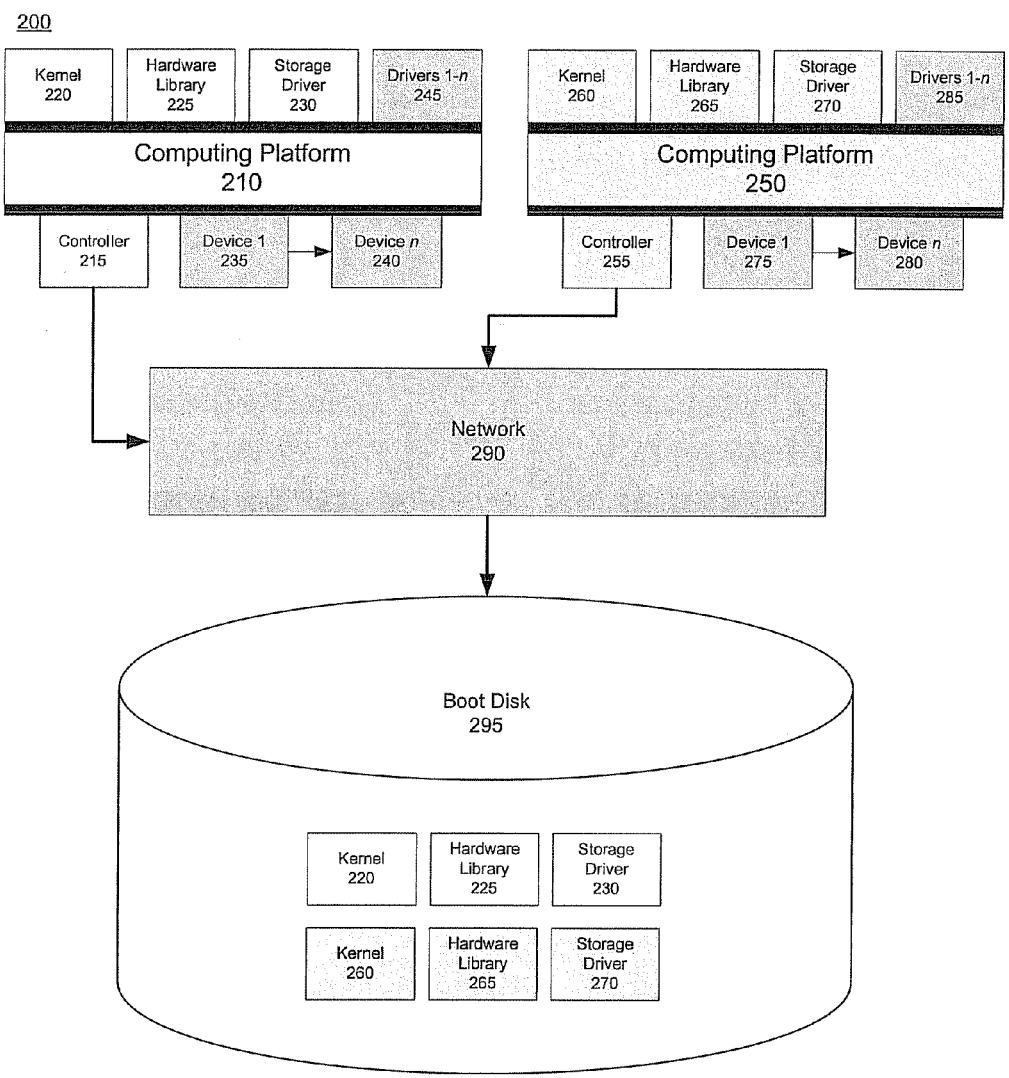
FIG. 2 illustrates a computing system having multiple heterogeneous computing platforms according to an example embodiment of the present invention.

FIG. 2 illustrates a computing system 200 that includes two heterogeneous computing platforms, according to an example embodiment of the present invention. For hardware maintenance, it may be desirable to use a common boot disk running a common operating system on two heterogeneous computing platforms. Computing system 200 may include computing platform 210 and computing platform 250. Computing platform 210 and computing platform 250 may be homogeneous or heterogeneous computing platforms. In the case of heterogeneous computing platforms, for example, computing platform 210 may be physical hardware or a virtual computing platform provided by a hypervisor application. Computing platform 250 may be physical hardware or a virtual computing platform provided by a hypervisor application that is different than computing platform 210.

As discussed above with respect to FIG. 1, a computing platform may include one or more files used to interact with an operating system and one or more connected hardware devices. Likewise, computing system 210 may include controller 215, kernel 220, hardware library 225, storage driver 230, device 1 235 to device n 240 and drivers 1-n 245. Computing system 250 may include controller 255, kernel 260, hardware library 265, storage driver 270, device 1 275 to device n 280 and drivers 1-n 285.

In an example embodiment of the present invention, the controllers of each computing platform may be operable to connect through network 290 to boot disk 295. Network 290 may include a local area network (LAN), wide area network (WAN), storage area network (SAN) and/or the Internet. Boot disk 295 may be a digital data storage medium that allows an operating system to be booted from the disk. Traditionally, a boot disk, such as boot disk 295 may be customized specifically for a particular computing platform. However, as illustrated in FIG. 2, an example embodiment of the present invention allows multiple sets of files to be stored on boot disk 295, each set of files containing the files used to perform an operating system boot operation for a respective computing platform. The different boot profiles may identify respective ones of the sets of files. The placement and transcription of these files may be made according to the standards of the operating system and the file system structure of the operating system.

Figure 3:
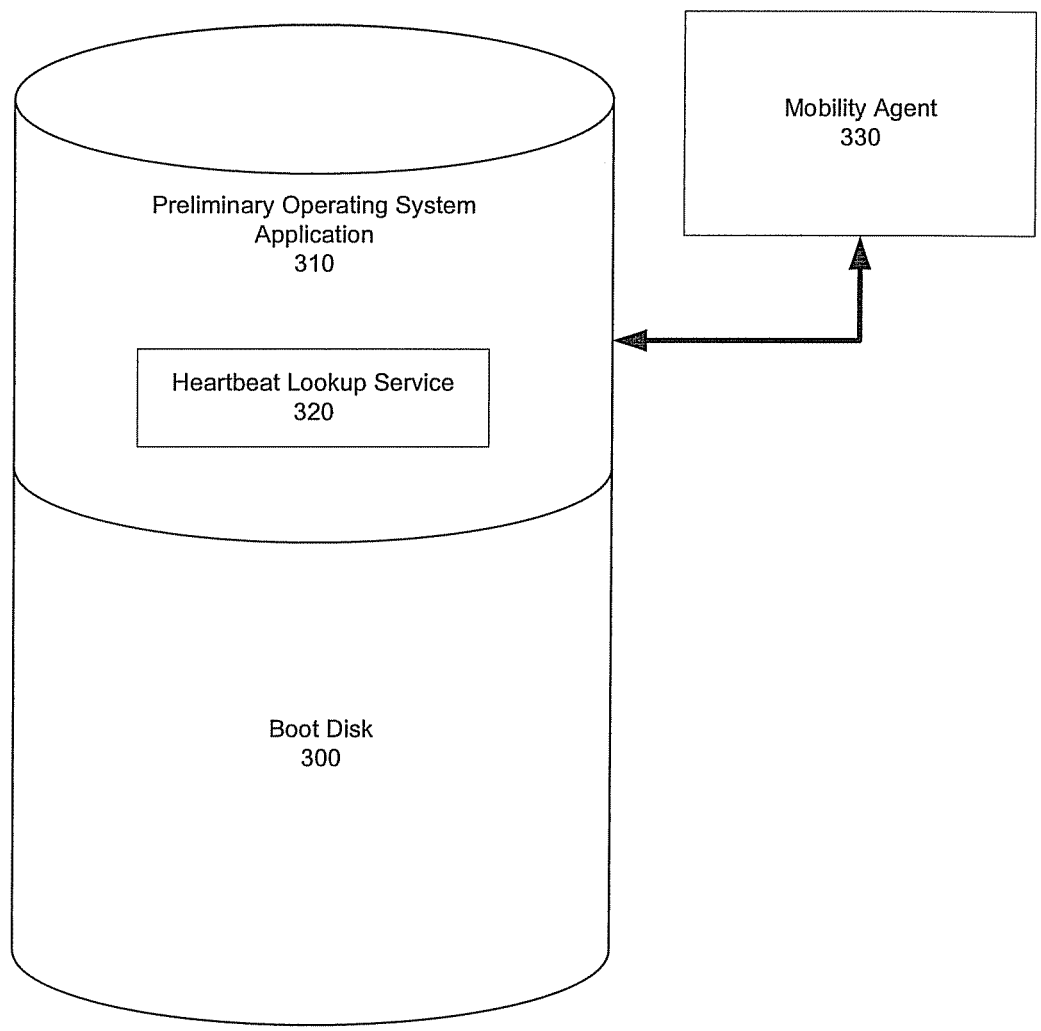
FIG. 3 illustrates a preliminary operating system according to an example embodiment of the present invention.

FIG. 3 illustrates a boot disk 300 according to one example embodiment of the present invention. Preliminary operating system application 310 may reside within boot disk 300. For example, preliminary operating system application 310 may reside within one or more sectors of boot disk 300 that are reserved for booting operations. Preliminary operating system application 310 may be pre-configured onto boot disk 300 using mobility agent 330. Mobility agent 330 may be a software application stored and executed by an operating system running on a first computing platform. Mobility agent 330 may receive a message that indicates that preliminary operating system application 310 needs to be prepared to run on a second, e.g., heterogeneous, computing platform. To prepare the preliminary operating system application 310 to boot and run on the second computing platform, mobility agent 330 may copy a boot profile and identified files for the second computing platform to preliminary operating system application 310. A boot profile may include identifications of a kernel, a hardware library and storage drivers associated with the second computing platform. An example of a boot disk that contains boot profiles for a plurality of computing platforms is illustrated in FIG. 2, as described above. Of course, more or less computing platforms may be prepared on a preliminary operating system application using one or more associated boot profiles. In an example embodiment of the present invention, mobility agent 330 may access a lookup table to determine the necessary files to include within a boot profile. In an example embodiment, the boot profiles may be embodied as the lookup table that associates collections of components with particular computing platforms, and that can be accessed by mobility agent 330. FIG. 4, described in detail below, illustrates an exemplary lookup table 400.

Preliminary operating system application 310 may also include and run heartbeat lookup service 320. Heartbeat lookup service 320 may be used to read heartbeat records written by a heartbeat producing service running within the operating system. After preliminary operating system application 310 is prepared with the proper boot profiles to run an operating system on one or more computing platforms, mobility agent 330 may shut down the operating system. After the operating system is shut down, the operator may attempt to restart the operating system using a new computing platform for which a boot profile has been prepared. When the new computing platform is turned on, heartbeat lookup service 320 is used to test for a "heartbeat," or indication that the operating system is running on another computing platform. A heartbeat may be detected using a specialized heartbeat record that is written to a sector of boot disk 300 and accessible by preliminary operating system application 310. The heartbeat record may be written using a heartbeat producing service, which may be a software application, running within the operating system. For example, a heartbeat record may be written by the heartbeat producing service in predetermined time intervals, for example, every sixty seconds. The heartbeat record may include a timestamp, a list of connected or active devices, disk activity, a manufacturer or model of a computing platform (i.e. hardware fingerprint) or other information that can identify the activity of the operating system. In addition to a heartbeat record, heartbeat lookup service 320 may check for one or more additional signs of system activity. These may include, but are not limited to the current network IP address, network subnet and hostname, the current workgroup or computer domain, information about currently running applications or services, or the information about logged in users, as well as other data change activities (e.g. changes in the journal log of a file system) on attached disks.

In an example embodiment of the present invention, preliminary operating system application 310 may also identify a hardware fingerprint using heartbeat lookup service 320. For example, the hardware fingerprint may identify a computing platform currently running preliminary operating system application 310, and the heartbeat lookup service 320 may use the previously discussed heartbeat records or other identified criteria to determine the hardware fingerprint. This may be done using a lookup table, such as lookup table 400 illustrated in FIG. 4. For example, a collection of components identified in a profile of the lookup table 400 may indicate the currently used computing platform associated by the lookup table 400 with the identified profile.

In another example embodiment, heartbeat lookup service 320 may compare detected criteria, such as MAC addresses or serial numbers, with past heartbeat records to determine whether the operating system is to be started on a new computing platform. If the current computing platform is the same as identified within a past heartbeat record, preliminary operating system application 310 may then boot the operating system using the previous boot profile. If the current computing platform is new, preliminary operating system application 310 may then boot the operating system using a new boot profile that was previously configured on the preliminary operating system application 310 by a mobility agent installed on the operating system, which is explained in more detail below.

FIG. 4 illustrates lookup table 400 according to one example embodiment of the present invention. Lookup table 400 may include records for each of a plurality of computing platforms. The records may indicate a kernel, hardware library and storage driver for each computing platform. The records for each computing platform may form a complete boot profile for the computing platform and/or may include other information that may be used by heartbeat lookup service 320 or mobility agent 330.

Figure 5:
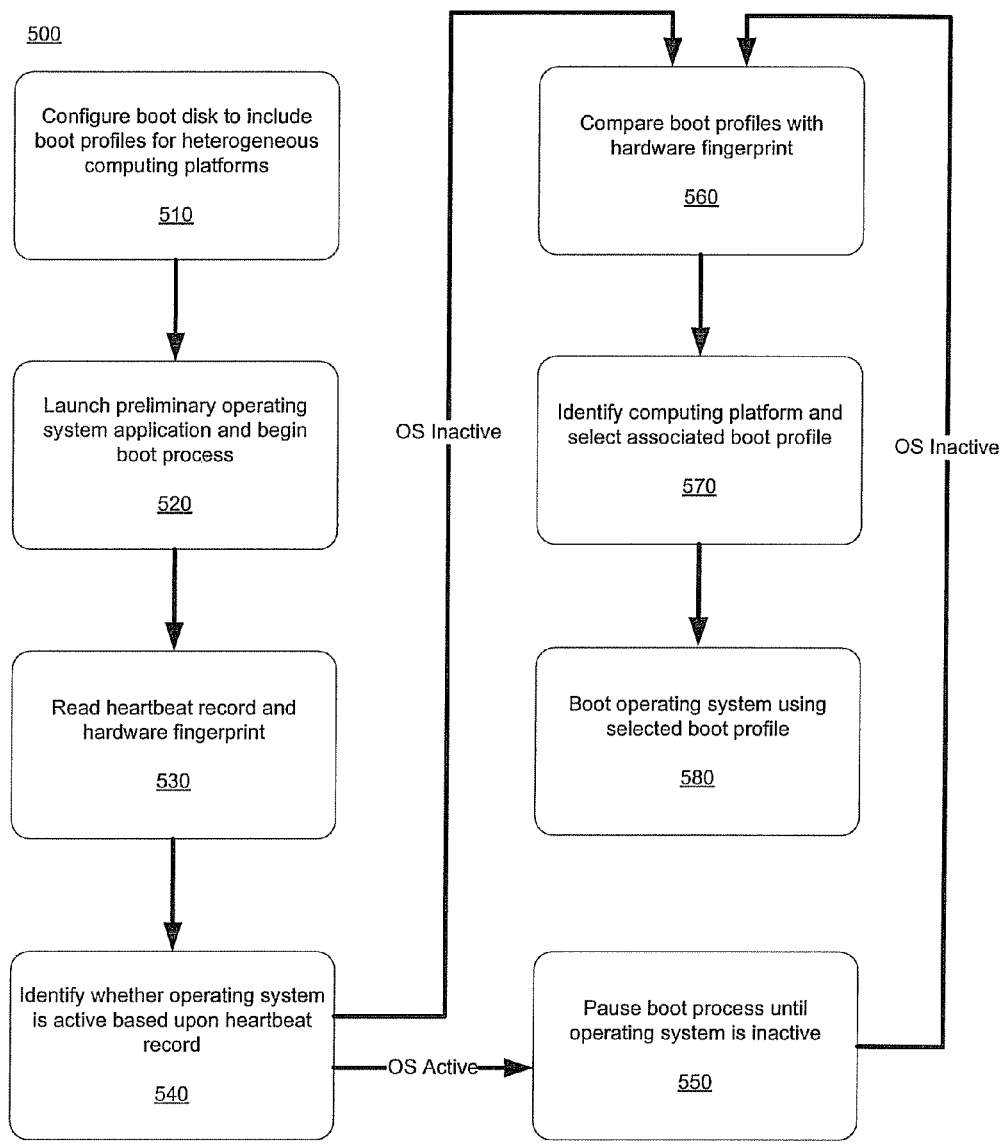
FIG. 5 illustrates a flowchart according to an example embodiment of the present invention.

FIG. 5 illustrates a method 500 according to one example embodiment of the present invention. The method 500 may include step 510, at which the method configures a boot disk to include boot profiles for heterogeneous computing platforms. The boot profile may include one or more files used to boot an operating system on a particular computing platform. For example, it may be desirable to stop using an operating system on a current computing platform and reboot the operating system on a different, new computing platform. Step 510 may be performed using a mobility agent that is installed on an operating system. Upon receipt of a message from a user or the operating system, the mobility agent may configure a boot disk with one or more boot profiles and associated files. The boot profiles may be contained in a lookup table. The lookup table may be manually or automatically configured and may be included within the mobility agent. The lookup table may be centrally maintained for a controlled set of supported computing platforms and may be embedded into a computing system. The configuration of the boot disk may include copying files to the proper sectors of the boot disk. The files may be identified using a boot profile or a lookup table. For example, a boot profile may include references to a kernel, hardware library and storage driver that are associated with a particular computing platform. After the boot disk is configured with the necessary boot profiles, the operating system may be shut down by a user or the mobility agent.

In one example embodiment, once the operating system is shut down, there may be two options. If the boot disk is network accessible from the new computing platform, the network may be switched such that the boot disk is connected to the new computing platform. In addition, the new computing platform may be instructed to boot from the boot disk. If the boot disk is not network accessible from the new computing platform, the boot disk may be copied using a standard copy mechanism to another boot disk that is accessible by the new computing platform. This may be achieved by leveraging the new computing platform facilities or, if the new computing platform is a virtual machine, by instructing the hypervisor application to attach the disk to the virtual machine. Furthermore, this step may include reprogramming of network devices, changing disk presentation and accessing control parameters.

In an example embodiment of the present invention, it may be possible that due to an error or otherwise, the new computing platform is not loaded properly or a boot profile has not been properly loaded into the preliminary operating system. In this situation, an on-screen indication may be displayed to the user explaining the particular problem. The mobility agent may then boot the last active boot profile based upon instructions by the user or the system.

At step 520, the method may launch a preliminary operating system application and begin a boot process. The preliminary operating system application may be launched during a reboot initiated by the mobility agent or user. The preliminary operating system application may be stored on a boot disk that can be used to boot an operating system on multiple heterogeneous computing platforms. The preliminary operating system application may be an application that is used to run a series of processes prior to the booting of an operating system. In other words, before an operating system boot process is started, the preliminary operating system application may be used to select the proper files to boot the operating system for a particular computing platform. The preliminary operating system application may, for instance, be a boot loader that is connected into a boot process. The preliminary operating system application may be active for a short period of time during the boot process, before the actual operating system boot process takes control of the computing platform.

Step 530 is reached once the boot process is underway. During step 530, one or more preliminary operating system services, e.g., the heartbeat lookup service, identifies a heartbeat record. A "heartbeat" may be an indication that the operating system is running on another computing platform. A heartbeat may be detected using a specialized heartbeat record that is written to a sector of the boot disk by a heartbeat producing service and is accessible by one or more preliminary operating system services. A heartbeat record may be written in predetermined time intervals, for example, every sixty seconds. The heartbeat record may include a timestamp, list of connected or active devices, disk activity, the manufacturer or model of a computing platform or other information that can identify the activity of the operating system. In addition to a heartbeat record, one or more preliminary operating system services may check for one or more additional signs of system activity. These may include, but are not limited to the current network IP address, network subnet and hostname, the current workgroup or computer domain, information about currently running applications or services, or the information about logged in users, as well as other data change activities (.e.g. changes in the journal log of a file system) on attached disks.

In an example embodiment of the present invention, one or more preliminary operating system services may also identify a hardware fingerprint during step 530. The hardware fingerprint may be a unique ID that identifies the hardware components relevant to the computing platform. For example, a preliminary operating system service may use the previously discussed heartbeat records or other identified criteria to determine the computing platform currently running the preliminary operating system application. The hardware fingerprint may be taken by scanning PCI and SM BIOS devices and using a lookup table to determine a matching computing platform. In an example embodiment, a preliminary operating system service may compare detected criteria such as MAC addresses or serial numbers with past heartbeat records to determine whether the operating system is to be run on a new computing platform, and if so, the hardware fingerprint of the new computing platform.

At step 540, the heartbeat record may be used to determine whether the operating system is active. Using the information present within the latest heartbeat record, one or more preliminary operating system services may determine if the operating system is currently running on a computing platform.

At step 550, if the heartbeat record identifies that the operating system is active, the preliminary operating system application may pause the boot process until the operating system becomes inactive. One or more preliminary operating system services may check for new heartbeat record activity in predetermined time intervals. The predetermined time intervals may be multiples of the predetermined time interval used to create heartbeat records. In other words, the boot process may be paused for a period of time equal to a multiple of the predetermined heartbeat record time intervals, the multiple being equal to or greater than 1. Once it has been determined that the operating system is inactive, the method may proceed to step 560.

If, at step 540, it is determined that the operating system is inactive, then the method may proceed to step 560, omitting step 550.

For the booting of the operating system, a boot profile may be selected based on the hardware fingerprint identified in step 530. Depending on whether the computing platform currently running the preliminary operating system is different than the previous computing platform, the method may either select a new boot profile or may select the previously-used boot profile. The boot profiles may be stored within a lookup table or may be dynamically created using data stored within a lookup table. At step 560, a comparison may be made between hardware profiles configured on the boot disk and the hardware fingerprint identified in step 530 to identify the hardware profile associated with the computing platform currently running the operating system. At step 570, a computing platform is identified based upon the comparison done in step 560 and the boot profile associated with the identified computing platform is selected. If the computing platform has not been changed from the previous computing platform, a previous boot profile may be used as the selected boot profile and the boot process may continue.

The boot profile may identify a kernel, hardware library and storage driver that may be used to boot an operating system on the identified computing platform. Once the proper boot profile has been selected, the operating system may be booted on the identified computing platform at step 580 and used with the components identified by the selected profile.

In an example embodiment of the present invention, a mobility agent may disable a set of computing platform agents associated with a previous computing platform after the operating system has been booted. Computing platform agents may be one or more computing platform-specific hardware agents and services that are used to run services available to a particular computing platform. After the previous computing platform agents have been disabled, the mobility agent may enable a new set of computing platform agents that are associated with the current computing platform. For initial setup, this may require user input, or otherwise may be completed exclusively using the mobility agent. The new set of computing platform agents may be accessed using the operating system, a website, a mobility agent or manually from user input of a storage medium containing the new platform agents.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), a field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Well-known operations, components and circuits have not been described in detail so as not to obscure the embodiments.

Numerous specific details have been set forth herein to provide a thorough understanding of the embodiments. The above description is intended to be illustrative, and not restrictive. Those skilled in the art can appreciate from the foregoing description that the various embodiments may be practiced without these specific details and may be implemented alone or in combination, and that the present invention may be implemented in a variety of forms. Therefore, while the embodiments of the present invention have been described in connection with particular examples thereof, the true scope of the embodiments and/or methods of the present invention should not be so limited since the specific structural and functional details disclosed herein may be representative, and other modifications will become apparent to the skilled practitioner upon a study of the drawings, specification, and following claims.

We claim:

1. A computer-implemented method for operating system mobility across computing platforms, the method comprising:
    responsive to power up of a first computing platform, and prior to booting an operating system on the first computing platform, periodically identifying, by a computer processor of the first computing platform and based on a heartbeat record that is stored in a boot disk in which the operating system is stored, whether the operating system is active until a determination that the operating system is inactive;
    responsive to the determination by the processor of the first computing platform that the operating system is inactive, selecting, by the processor, one of a plurality of boot profiles that are each stored in association with a respective one of a plurality of computing platforms for respective use in a respective booting of the operating system on the respective computing platform, the selected boot profile being associated with the first computing platform; and
    using the selected boot profile, by the processor, in a booting process for booting the operating system on the first computing platform.

2. The method of claim 1, wherein the heartbeat record includes one or more of a timestamp, a list of connected or active devices and disk activity.

3. A computer-implemented method for operating system mobility across computing platforms, the method comprising:
    periodically identifying, by a computer processor and based on a heartbeat record, whether an operating system is active on a first one of a plurality of computing platforms until a determination that the operating system is inactive, wherein the operating system and a boot disk in which the operating system and the heartbeat record are stored are shared by the plurality of computing platforms;
    upon the determination that the operating system is inactive on the first computing platform, selecting, by the processor, one of a plurality of boot profiles that are each stored in association with a respective one of the plurality of computing platforms for respective use in a respective booting of the operating system on the respective computing platform, the selected boot profile being associated with a second one of the plurality of computing platforms;
    using the selected boot profile, by the processor, in a booting process for booting the operating system on the second computing platform, wherein the booting process is begun prior to the determination that the operating system is inactive; and
    in response to a determination, in the identifying step, that the operating system is active, pausing the booting process until the determination that the operating system is inactive.

4. The method of claim 1, wherein the plurality of computing platforms, including the first and second computing platforms, are heterogeneous computing platforms.

5. A computer-implemented method for operating system mobility across computing platforms, the method comprising:
    periodically identifying, by a computer processor and based on a heartbeat record, whether an operating system is active on a first one of a plurality of computing platforms until a determination that the operating system is inactive, wherein the operating system and a boot disk in which the operating system and the heartbeat record are stored are shared by the plurality of computing platforms;
    upon the determination that the operating system is inactive on the first computing platform, selecting, by the processor, one of a plurality of boot profiles that are each stored in association with a respective one of the plurality of computing platforms for respective use in a respective booting of the operating system on the respective computing platform, the selected boot profile being associated with a second one of the plurality of computing platforms;
    using the selected boot profile, by the processor, in a booting process for booting the operating system on the second computing platform;
    identifying the first computing platform; and
    comparing the first computing platform to the second computing platform, wherein the selection is of a previous profile where it is determined in the comparing step that the first computing platform and the second platform are of the same type.

6. A computer-implemented method for operating system mobility across computing platforms, the method comprising:

periodically identifying, by a computer processor and based on a heartbeat record, whether an operating system is active on a first one of a plurality of computing platforms until a determination that the operating system is inactive, wherein the operating system and a boot disk in which the operating system and the heartbeat record are stored are shared by the plurality of computing platforms;

upon the determination that the operating system is inactive on the first computing platform, selecting, by the processor, one of a plurality of boot profiles that are each stored in association with a respective one of the plurality of computing platforms for respective use in a respective booting of the operating system on the respective computing platform, the selected boot profile being associated with a second one of the plurality of computing platforms;

using the selected boot profile, by the processor, in a booting process for booting the operating system on the second computing platform;

identifying which of the plurality of boot profiles is associated with the first computing platform; and comparing the selected boot profile with the identified boot profile, wherein the processor uses components previously used for the first computing platform for the booting process.

7. The method of claim 2, further comprising:
writing the heartbeat record to a sector of the boot disk at predetermined time intervals.

8. The method of claim 7, wherein the boot disk is connected to the plurality of computing platforms using a storage area network.

9. The method of claim 7, wherein the periodic interval for the periodic identification is equal to a multiple of a length of the predetermined time intervals, the multiple being at least 1.

10. A computer-implemented method for operating system mobility across computing platforms, the method comprising:
periodically identifying, by a computer processor and based on a heartbeat record, whether an operating system is active on a first one of a plurality of computing platforms until a determination that the operating system is inactive, wherein the operating system and a boot disk in which the operating system and the heartbeat record are stored are shared by the plurality of computing platforms;

upon the determination that the operating system is inactive on the first computing platform, selecting, by the processor, one of a plurality of boot profiles that are each stored in association with a respective one of the plurality of computing platforms for respective use in a respective booting of the operating system on the respective computing platform, the selected boot profile being associated with a second one of the plurality of computing platforms;

using the selected boot profile, by the processor, in a booting process for booting the operating system on the second computing platform, wherein the booting process is begun prior to the determination that the operating system is inactive; and pausing the booting process for a duration of the periodically identifying step.

11. The method of claim 1, further comprising, responsive to the determination that the operating system is inactive:
disabling a first set of computing platform agents associated with a second computing platform; and enabling a second set of computing platform agents associated with the first computing platform.

12. The method of claim 1, wherein the identification is based upon one or more of a timestamp, a list of active devices, logged disk activity, current network identification information, currently running applications and currently logged-in users.

13. The method of claim 1, wherein the plurality of boot profiles are stored in a lookup table that is accessible for the selecting step.

14. A system for operating system mobility across heterogeneous computing platforms, the system comprising:
a processor programmed to perform the steps of:
periodically identifying, based on a heartbeat record, whether an operating system is active on a first one of a plurality of computing platforms until a determination that the operating system is inactive, wherein the operating system and a boot disk in which the operating system and the heartbeat record are stored are shared by the plurality of computing platforms;

upon the determination that the operating system is inactive on the first computing platform, selecting one of a plurality of boot profiles that are each stored in association with a respective one of the plurality of computing platforms for respective use in a respective booting of the operating system on the respective computing platform, the selected boot profile being associated with a second one of the plurality of computing platforms;

using the selected boot profile, in a booting process for booting the operating system on the second computing platform, wherein the booting process is begun prior to the determination that the operating system is inactive; and in response to a determination, in the identifying step, that the operating system is active, pausing the booting process until the determination that the operating system is inactive.

15. The system of claim 14, wherein the plurality of computing platforms, including the first and second computing platforms, are heterogeneous computing platforms.

16. A hardware computer-readable storage medium on which there are stored instructions executable by a processor, the instructions which, when executed by the processor, cause the processor to perform the steps of:
periodically identifying, based on a heartbeat record, whether an operating system is active on a first one of a plurality of computing platforms until a determination that the operating system is inactive, wherein the operating system and a boot disk in which the operating system and the heartbeat record are stored are shared by the plurality of computing platforms;

upon the determination that the operating system is inactive on the first computing platform, selecting one of a plurality of boot profiles that are each stored in association with a respective one of the plurality of computing platforms for respective use in a respective booting of the operating system on the respective computing platform, the selected boot profile being associated with a second one of the plurality of computing platforms;

using the selected boot profile, in a booting process for booting the operating system on the second computing platform, wherein the booting process is begun prior to the determination that the operating system is inactive; and in response to a determination, in the identifying step, that the operating system is active, pause the booting process until the determination that the operating system is inactive.

17. The method of claim 1, wherein:
a module executed by running of the operating system on a second computing platform responds to a message by:
updating the boot disk to include the boot profile that is associated with the first computing platform; and
shutting down the execution of the operating system on the second computing platform; and
the periodically identifying by the processor of the first computing environment is performed subsequent to the shutting down.

18. The method of claim 17, wherein the operating system and the boot disk are shared by the plurality of computing platforms, including the first and second computing platforms.

19. The method of claim 1, wherein the operating system and the boot disk in which the operating system is stored are shared by the plurality of computing platforms, including the first and second computing platforms.

20. A computer-implemented method for operating system mobility across computing platforms, the method comprising:
executing, by a computer processor running an operating system on a first computing platform, a module, by which execution, the processor responds to a message by:
updating a boot disk to include a boot profile that is associated with a second computing platform; and
shutting down the running of the operating system on the first computing platform;
wherein:
the operating system is stored in a boot disk which stores a heartbeat record on which basis a periodic identification of whether the operating system is active is performed (a) responsive to power up of the second computing platform and (b) until a determination that the operating system is inactive; and
subsequent to the shutting down, the boot profile is usable by the second computing platform, upon power up of the second computing platform, to boot the operating system on the second computing platform.

* * * * *